United States Patent
Bartz et al.

(10) Patent No.: US 7,057,520 B1
(45) Date of Patent: Jun. 6, 2006

(54) MOBILE TRANSPONDER FOR A MOTOR VEHICLE

(75) Inventors: Ruediger Bartz, Munich (DE); Carsten Befelein, Haar (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/700,066

(22) PCT Filed: Apr. 27, 1999

(86) PCT No.: PCT/EP99/02819

§ 371 (c)(1),
(2), (4) Date: Mar. 20, 2001

(87) PCT Pub. No.: WO99/58794

PCT Pub. Date: Nov. 18, 1999

(30) Foreign Application Priority Data

May 9, 1998 (DE) .................................. 198 20 921

(51) Int. Cl.
*G05B 5/22* (2006.01)
(52) U.S. Cl. .............................. 340/825.49; 340/572.7; 340/568.1; 340/572.1; 340/10.1; 340/825.69; 340/825.72; 340/5.61; 340/10.5; 342/357.09; 342/46
(58) Field of Classification Search ........... 340/825.49, 340/572.7, 10.1, 961, 568.1, 572.1, 825.69, 340/825.72, 5.61, 10.5; 455/456.2; 342/357.09, 342/46; 116/209
See application file for complete search history.

(56) References Cited

U.S. PATENT DOCUMENTS

| | | | |
|---|---|---|---|
| 3,665,312 A | 5/1972 | Jarvis | 325/54 |
| 4,403,208 A | 9/1983 | Hodgson et al. | 340/33 |
| 4,454,583 A | 6/1984 | Schneiderhan et al. | 364/449 |
| 4,673,921 A | 6/1987 | Saito et al. | 340/539 |
| 4,742,356 A * | 5/1988 | Kuipers | 342/448 |
| 4,797,671 A * | 1/1989 | Toal, Jr. | 340/825.49 |
| 5,523,762 A | 6/1996 | Streetman | 342/357 |
| 5,561,331 A | 10/1996 | Suyama et al. | 307/10.3 |
| 5,594,448 A | 1/1997 | d'Hont | 342/44 |
| 5,657,026 A | 8/1997 | Culpepper et al. | 342/374 |
| 5,825,329 A * | 10/1998 | Veghte et al. | 343/700 MS |
| 5,898,405 A * | 4/1999 | Iwasaki | 343/700 MS |

FOREIGN PATENT DOCUMENTS

| | | |
|---|---|---|
| DE | 25 58 218 | 7/1977 |
| DE | 37 40 770 | 6/1989 |
| DE | 43 09 819 | 9/1994 |

(Continued)

*Primary Examiner*—Brian Zimmerman
*Assistant Examiner*—Vernal Brown
(74) *Attorney, Agent, or Firm*—Crowell & Moring LLP

(57) ABSTRACT

A mobile transponder for vehicles with an optical indicator providing information concerning the direction from the transponder to a vehicle. A plurality of antennas provide three-dimensional directional characteristics in order to recognize the signal from the vehicle and to provide a directed output. An evaluation circuit analyzes the signal from the antenna and provides output information concerning the direction and location of the vehicle in relationship to the transponder. This information is displayed on the transponder regardless of the orientation of the transponder.

3 Claims, 2 Drawing Sheets

FOREIGN PATENT DOCUMENTS

| | | |
|---|---|---|
| DE | 195 13 498 | 6/1996 |
| DE | 195 42 441 | 5/1997 |
| DE | 196 08 777 | 9/1997 |
| EP | 0 741 221 | 11/1996 |
| FR | 2 620 096 | 3/1989 |
| FR | 2 699 467 | 6/1994 |
| GB | 2 240 418 | 7/1991 |
| JP | 60-222782 | 11/1985 |
| WO | WO 89/11139 | 11/1989 |
| WO | WO 95/14935 | 6/1995 |
| WO | WO 95/14936 | 6/1995 |
| WO | WO 96/22439 | 7/1996 |
| WO | WO 98/23971 | * 6/1998 |

* cited by examiner

Remote Control Push Button 9
Directional Display by Means of Active LEDs 8
Remote Control Push Button
LEDs for Display of Direction Level at the Individual Antennas

MOBILE TRANSPONDER FOR A MOTOR VEHICLE

BACKGROUND AND SUMMARY OF THE INVENTION

This application claims the priority of German Patent Document 198 20 921.5, filed May 9, 1998 and European Patent Application PCT EP99/02819 filed Apr. 27, 1999, the disclosures of which are expressly incorporated by reference herein.

The invention relates to a mobile transponder for a vehicle with a visual display.

Such a key is known from the DE 3740770 A. The visual display signals whether the vehicle is locked. However, it is often necessary to obtain information about the location of the vehicle. In this context it is known to provide a key of the vehicle with a voice storage, into which the location of the vehicle can be spoken (see DE 4309819 A). Relocating the vehicle is a function of whether this measure was actually performed, e.g. upon leaving the vehicle.

The invention is based on the problem of providing a mobile transponder for vehicles, whose visual display makes it possible to obtain an additional statement about the vehicle.

It is now possible with the aid of the visual display to recognize where the vehicle is located. An interrogation signal is transmitted over the antennas. The result is that the vehicle responds in the form of a radio signal. This response is evaluated in the transponder and displayed as visual information. Thus, it is absolutely possible with the directional characteristics of the antennas to detect the location of the vehicle with respect to its direction relative to the respective position and alignment of the transponder. This direction is signaled to the driver by an appropriate visual display.

The visual display can be designed as a small display, for example an LCD display. The direction, in which the vehicle is located with respect to the mobile transponder, can be presented as an arrow inside the display.

Correspondingly it is possible to show the directional information with the aid of light, for example LEDs (=light emitting diodes). They can be configured in a circle. The direction, in which the vehicle is located, can be determined with respect to the center point of the circle. Two diagonally opposite LEDs can also be activated. Thus the direction can be determined and indicated relatively. Frequently this information is adequate. Of the two directions that are thus possible, the driver has only to eliminate the direction opposite the actual direction.

In contrast, an improvement is a design that shows correctly and clearly the direction. One prerequisite is a corresponding directional characteristic of the antennas.

In another improvement of the invention the antennas determine not only the direction but also, in fact, the distance of the vehicle from the respective location. Thus, the vehicle user has the information, how far away the vehicle is from his respective location, where he and his mobile transponder are located.

BRIEF DESCRIPTION OF THE DRAWINGS

The invention is explained in detail with reference to the drawings.

DETAILED DESCRIPTION OF THE PREFERRED EMBODIMENT

Figure 1A:
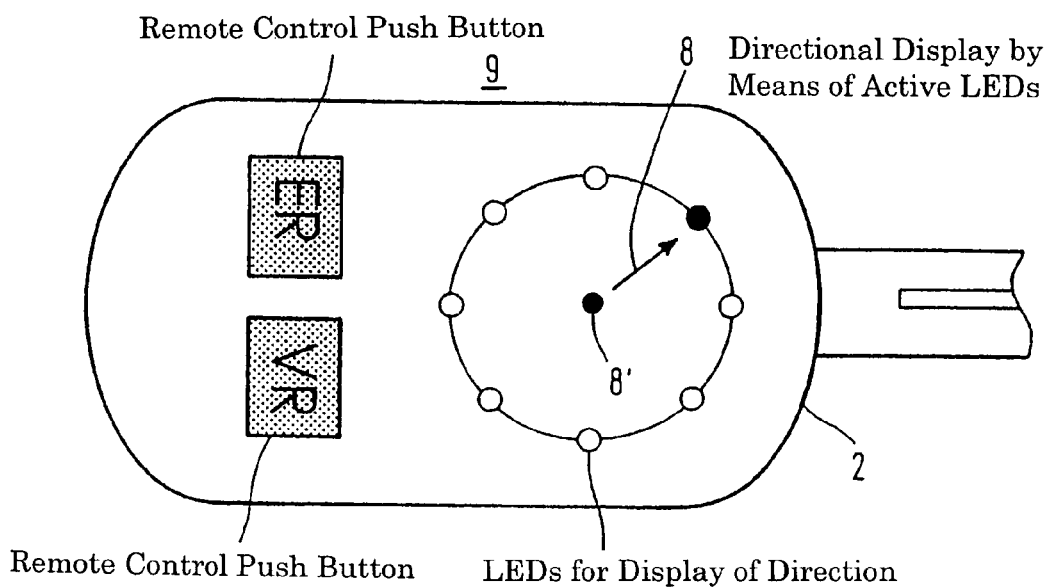
FIG. 1 is a first embodiment of the invention.
Figure 1B:
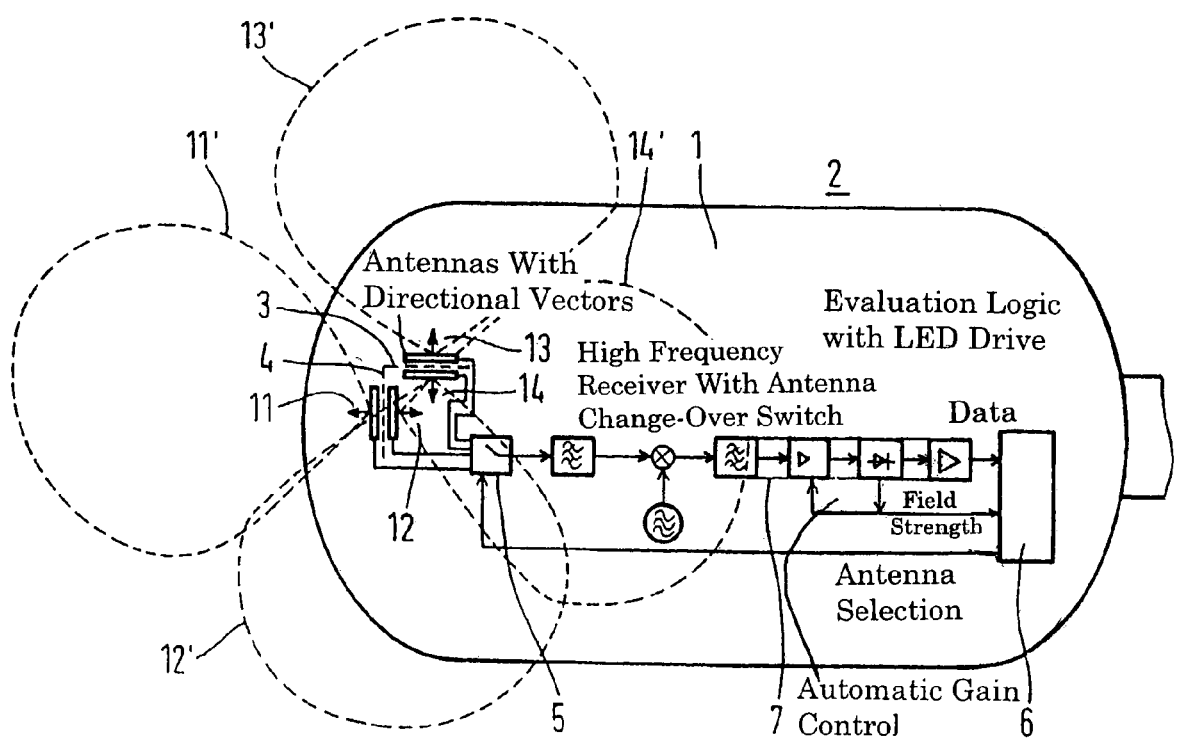
Figure 1C:
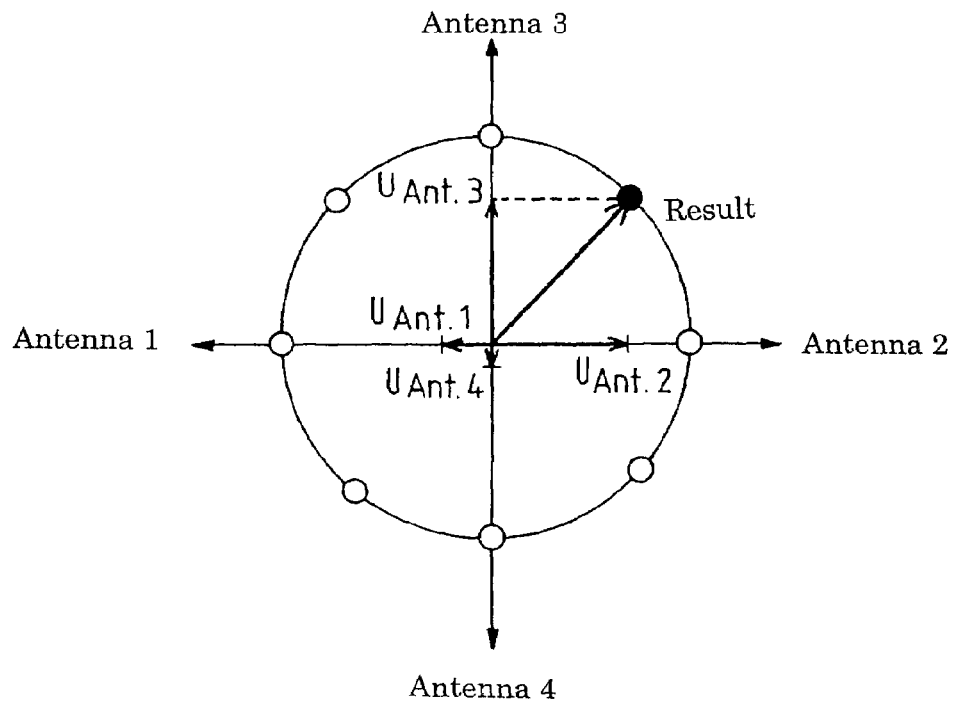

In the embodiment from FIG. 1, comprising the parts a, b, and c, a mobile transponder 1, whose individual parts are depicted in b), is integrated into a mechanical vehicle key 2 (a)). The transponder 1 contains four antennas 11, 12, 13, and 14, of which two 11, 12 or 13, 14 are separated from each other by an intercalated shielding plate 3, 4. The antennas exhibit necessarily due to the effect of the shielding plates a directional characteristic that is symbolized by the dashed lobes 11'–14'.

The antennas 11 to 14 are assigned a change-over switch 5, by means of which the antennas are activated in sequence by means of an evaluating unit 6. The antennas emit in response to a manual command an interrogation signal, which is picked up by the sought-for vehicle and is answered through output of a response signal by means of the vehicle. This command is sent by actuating a remote operating push button VR in the key head 9.

By means of the change-over switch 5 these response signals are entered sequentially into the evaluating unit 6 by means of an appropriate conditioning circuit 7. Owing to the antennas' sensitivity to direction, shown in c), the result of evaluating the entire 4 response signals is information about the location of the vehicle. This information is shown with the aid of a visual display 8, which is provided in the surface of the key head 9. The display 8 comprises LEDs, configured in a circle around a center 8'.

Of these LEDs the LED lying in the direction of the sought-for vehicle and the LED located in the center are activated. In the case of a horizontal arrangement of the key head 9, the direction, in which the sought-for vehicle is located, is determined by the imaginary connection of these LEDs.

It is also possible with an arrow arranged between the two activated LEDs to present a measure of the vehicle's distance. In the case of a short distance of, e.g. less than 50 m, the arrow is intensely illuminated; for a greater distance, in contrast, the illumination is weaker. A measure for distance follows from a strength comparison of the response signals picked up with the corresponding antennas 11 and 12 or 13 and 14. Assuming that the signals from the sought-for vehicle are emitted at constant intensity, the result of forming the quotient of the intensity of the corresponding response signals and the evaluation of this quotient with the individual intensity is information about the distance of the sought-for vehicle from the transponder 1.

Figure 2:
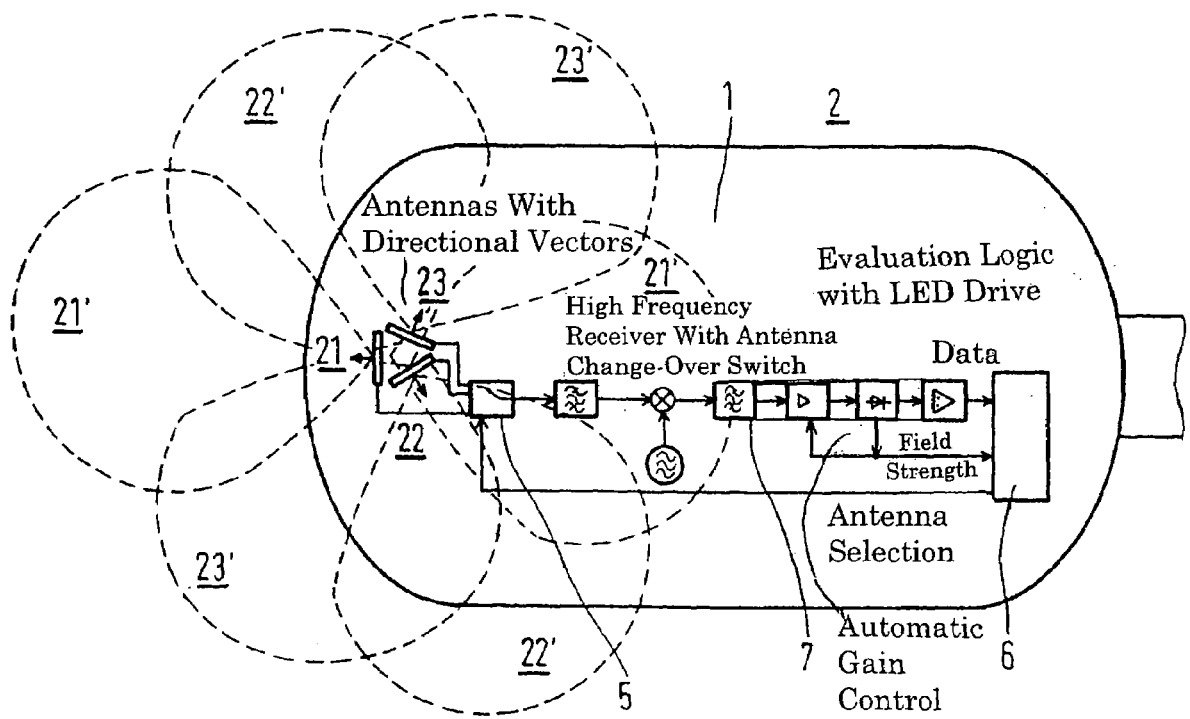
FIG. 2 is an alternative to the embodiment of FIG. 1.

In the embodiment depicted in FIG. 2, there are, instead of four antennas, three antennas 21, 22, 23. They also exhibit the directional characteristics, shown with the dashed line. Thus, it is again possible in the respective sequence of interrogation and response signals, which are emitted one after the other with each of the antennas or are picked up as the response of the vehicle, to obtain as information the desired direction and also, by comparison of the intensity of the respective signals, their distance and to display visually by means of a visual display, like an arrow in a display, or, as shown in FIG. 1, in an LED circle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A mobile transponder for vehicles with an optical indicator corresponding to the vehicle, said mobile transponder comprising:
   a plurality of antennas having three-dimensional directional characteristics for recognizing a signal from the vehicle and providing a directed output;
   evaluation logic receiving said directed output and providing output information concerning direction and location of the vehicle in relationship to the mobile transponder;
   a display for receiving and displaying said information concerning direction and location of the vehicle regardless of the orientation of the transponder.

2. A mobile transponder according to claim 1, wherein said information from said directed output from said plurality of antenna provides an indication of the distance of the vehicle from the mobile transponder.

3. A mobile transponder according to claim 2, wherein the distance indication is presented by means of said display.

* * * * *